(12) United States Patent
Olander

(10) Patent No.: US 11,293,579 B2
(45) Date of Patent: *Apr. 5, 2022

(54) PIPE LOOSENING DEVICE AND METHOD

(71) Applicant: TT Technologies, Inc., Aurora, IL (US)

(72) Inventor: John A. Olander, Aurora, IL (US)

(73) Assignee: TT Technologies, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/952,966

(22) Filed: Nov. 19, 2020

(65) Prior Publication Data
US 2021/0071780 A1 Mar. 11, 2021

Related U.S. Application Data

(60) Continuation of application No. 16/545,333, filed on Aug. 20, 2019, now Pat. No. 10,883,627, which is a division of application No. 15/865,031, filed on Jan. 8, 2018, now Pat. No. 10,422,441.

(60) Provisional application No. 62/444,158, filed on Jan. 9, 2017.

(51) Int. Cl.
| | |
|---|---|
| F16L 55/18 | (2006.01) |
| F16L 1/028 | (2006.01) |
| F16L 55/30 | (2006.01) |
| F16L 55/40 | (2006.01) |
| E21B 19/16 | (2006.01) |
| F16L 1/024 | (2006.01) |
| F16L 1/032 | (2006.01) |
| F16L 1/06 | (2006.01) |
| F16L 55/165 | (2006.01) |
| F16L 55/16 | (2006.01) |

(52) U.S. Cl.
CPC .............. *F16L 55/18* (2013.01); *E21B 19/16* (2013.01); *F16L 1/024* (2013.01); *F16L 1/028* (2013.01); *F16L 1/032* (2013.01); *F16L 1/06* (2013.01); *F16L 55/1658* (2013.01); *F16L 55/30* (2013.01); *F16L 55/40* (2013.01); *F16L 55/1608* (2013.01)

(58) Field of Classification Search
CPC .............................. F16L 55/18; F16L 55/1658
See application file for complete search history.

(56) References Cited

U.S. PATENT DOCUMENTS

| | | |
|---|---|---|
| 2,546,756 A | 3/1951 | Knowlton |
| 4,134,286 A | 1/1979 | Martin |
| 4,309,128 A | 1/1982 | Williams |
| 4,457,647 A | 7/1984 | Dusette et al. |
| 4,657,436 A | 4/1987 | Yarnell |

(Continued)

OTHER PUBLICATIONS

"U.S. Appl. No. 15/865,031, Final Office Action dated Feb. 4, 2019", 6 pgs.

(Continued)

*Primary Examiner* — Frederick L Lagman
(74) *Attorney, Agent, or Firm* — Schwegman Lundberg & Woessner, P.A.

(57) ABSTRACT

A pipe loosening device and methods are shown. In one example, the pipe loosening device enables a method wherein a pipe to be replaced is deformed but not burst, and a portion of a sidewall of the pipe is forced outward into the surrounding soil to compact a local region of the surrounding soil and loosen the existing pipe. The pipe may then pulled from the ground along an axis of the pipe.

19 Claims, 5 Drawing Sheets

(56) References Cited

U.S. PATENT DOCUMENTS

| | | | |
|---|---|---|---|
| 4,789,268 A | 12/1988 | Yarnell | |
| 4,848,964 A * | 7/1989 | Yarnell | F16L 55/1658 405/184.3 |
| 4,928,866 A | 5/1990 | Carruthers | |
| 4,930,542 A | 6/1990 | Winkle et al. | |
| 5,076,730 A | 12/1991 | Bergey | |
| 5,078,546 A | 1/1992 | Fisk et al. | |
| 5,192,165 A | 3/1993 | Torielli | |
| 5,439,320 A | 8/1995 | Abrams | |
| 6,305,880 B1 | 10/2001 | Carter et al. | |
| 6,457,532 B1 | 10/2002 | Simpson | |
| 7,220,080 B1 | 5/2007 | Grimmett | |
| 7,308,944 B2 | 12/2007 | Johnston et al. | |
| 7,371,031 B1 | 5/2008 | Grimmett | |
| 7,559,722 B2 | 7/2009 | Crane | |
| 7,624,817 B2 | 12/2009 | Putnam | |
| 7,824,130 B2 | 11/2010 | Koch et al. | |
| 7,914,233 B2 | 3/2011 | Crane | |
| 9,322,503 B2 * | 4/2016 | Thompson | F16L 55/1657 |
| 10,422,441 B2 | 9/2019 | Olander | |
| 10,571,065 B2 * | 2/2020 | Thompson | F16L 55/1658 |
| 10,883,627 B2 * | 1/2021 | Olander | E21B 19/16 |
| 2002/0114671 A1 | 8/2002 | Wentworth et al. | |
| 2003/0017008 A1 | 1/2003 | Robinson | |
| 2003/0106698 A1 | 6/2003 | Simpson et al. | |
| 2003/0152428 A1 | 8/2003 | Wentworth et al. | |
| 2006/0034666 A1 | 2/2006 | Wentworth et al. | |
| 2006/0088384 A1 | 4/2006 | Putnam | |
| 2007/0036613 A1 | 2/2007 | Tjader | |
| 2011/0081205 A1 | 4/2011 | Tjader | |
| 2014/0270970 A1 | 9/2014 | Aus | |
| 2015/0198279 A1 | 7/2015 | Randa et al. | |
| 2015/0362116 A1 * | 12/2015 | Thompson | F16L 55/18 138/97 |
| 2017/0276282 A1 | 9/2017 | Casagranda | |
| 2018/0195641 A1 | 7/2018 | Olander | |
| 2020/0072385 A1 | 3/2020 | Olander | |

OTHER PUBLICATIONS

"U.S. Appl. No. 15/865,031, Non Final Office Action with Restriction Requirement dated Aug. 9, 2018", 11 pgs.

"U.S. Appl. No. 15/865,031, Notice of Allowance dated May 22, 2019", 5 pgs.

"U.S. Appl. No. 15/865,031, Preliminary Amendment filed Jan. 25, 2018", 7 pgs.

"U.S. Appl. No. 15/865,031, Response filed May 6, 2019 to Final Office Action dated Feb. 4, 2019".

"U.S. Appl. No. 15/865,031, Response filed Nov. 8, 2018 to Non-Final Office Action dated Aug. 9, 2018", 7 pgs.

"U.S. Appl. No. 16/545,333, Non Final Office Action dated Mar. 3, 2020", 10 pgs.

"U.S. Appl. No. 16/545,333, Notice of Allowance dated Aug. 19, 2020", 5 pgs.

"U.S. Appl. No. 16/545,333, Response filed Jun. 3, 2020 to Non Final Office Action dated Mar. 3, 2020", 8 pgs.

"U.S. Appl. No. 16/545,333, Supplemental Notice of Allowability dated Oct. 9, 2020", 2 pgs.

\* cited by examiner

PIPE LOOSENING DEVICE AND METHOD

PRIORITY

This application is a continuation of U.S. patent application Ser. No. 16/545,333, now U.S. Pat. No. 10,883,627, filed Aug. 20, 2019, which is a division of U.S. patent application Ser. No. 15/865,031, now U.S. Pat. No. 10,442,441, filed Jan. 8, 2018, which claims the benefit of priority to U.S. Provisional Application Ser. No. 62/444,158, filed Jan. 9, 2017, all of which are incorporated by reference herein in their entirety.

TECHNICAL FIELD

Embodiments described herein generally relate to pipe removal from underground. Specific examples may include using a die to loosen a pipe within soil before removing the pipe from the ground.

BACKGROUND

Pipe bursting is an existing technique where an old pipe is replaced by bursting the old pipe into the surrounding soil. A new pipe is then pulled into place where the old burst pipe once was. This technique is desirable because the old pipe may be replaced without digging a trench to access it. However, in some instances it may be desirable to replace an old pipe trenchlessly, but it may also be desirable to remove the old pipe from the ground. One example includes replacement of lead pipes. It is desirable to replace the pipe trenchlessly to avoid disturbing top surface structures such as roadways. However it is desirable to remove the lead pipe completely because lead may be hazardous to the environment.

Devices and methods are desired to accomplish these and other goals.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A number of forcing equipment may be used with pipe loosening devices according to examples described in the present disclosure. In one example, a deforming die is pushed through a pipe to be replaced, as will be described in greater detail in examples below. One example of a pushing device includes a pneumatic hammer. Another example of a pushing device includes a static rod pusher.

In one example, a deforming die is pulled through a pipe to be replaced, as will be described in greater detail in examples below. One example of a pulling device includes a winch and cable. Another example of a pulling device includes a static rod puller.

In one example a horizontal directional drill (HDD) may be used to either pull or push a deforming die. One of ordinary skill in the art, having the benefit of the present disclosure, will recognize that the examples of forcing equipment (pulling and pushing) are not limiting. Other forcing equipment may also be used within the scope of the invention.

Figure 1:
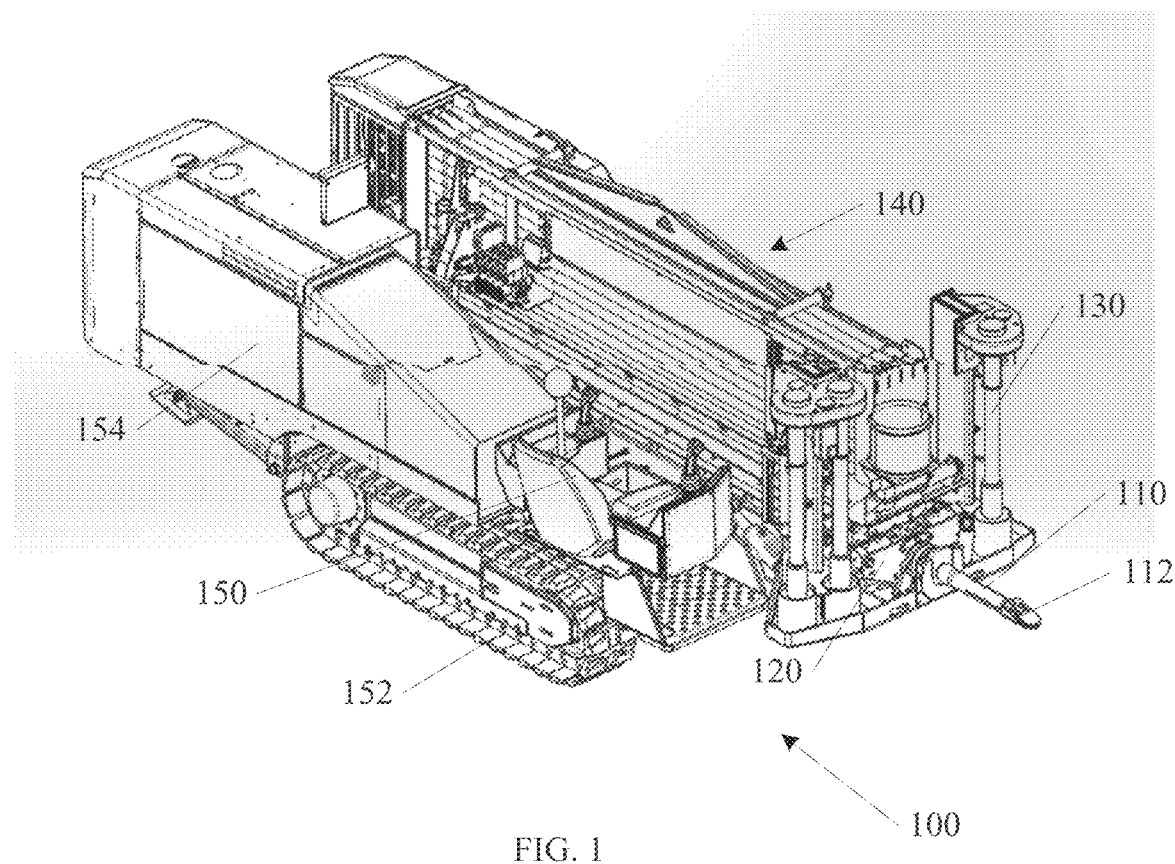
FIG. 1 is a directional drill in accordance with some embodiments of the invention.

As discussed above, one example of forcing equipment includes a directional drill. FIG. 1 shows an example of a directional drill 100. The directional drill 100 includes a drill stem 110 including an attached sonde housing, and a drill head 112 for piercing the ground and leading a directional drill bore operation. A drill stem loader 140 is shown coupled to the directional drill 100. The drill stem loader 140 is configured to pick drill stem segments (or drill rods) from a drill stem magazine and add stem segments to the stem 110 during a boring operation. The drill stem loader 140 is further configured to remove stem segments from the drill stem 110 and replace them in the drill stem magazine after the boring operation is complete, and the drill stem is being retracted from the bore.

A power supply 154 is coupled to the directional drill 100 to drive the drill stem 110, and to operate other aspects of the directional drill 100. A cockpit 150 is further included in the directional drill 100, the cockpit 150 including a number of controllers and gauges to control and monitor a drilling operation. In on example, a track system 152 is included on the directional drill 100 to move and position the directional drill 100. A stake down system 130 is also shown coupled to a front end of the directional drill 100 in the example of FIG. 1. A drill stem vice 120 is further shown at a front end of the directional drill 100. Additional aspects of the drill stem vice 120 are described in more detail below.

Figure 2:
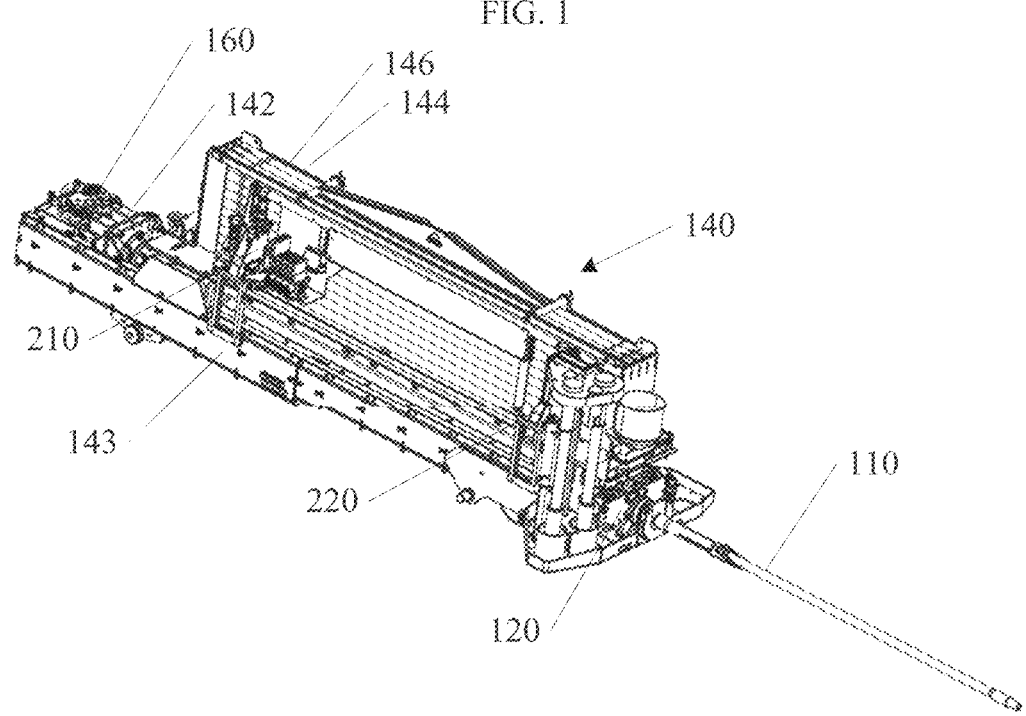
FIG. 2 is a portion of a directional drill in accordance with some embodiments of the invention.

FIG. 2 shows a portion of a directional drill 100 from FIG. 1, with a number of components removed to reveal more detail of a directional drill stem loader 140. The drill stem loader 140 includes a drill stem magazine 144, having a number of individual drill stem segments 146 loaded into the magazine 144.

A first linear actuator 210 and a second linear actuator 220 are shown adjacent to the drill stem magazine 144. In one example, the linear actuators 210, 220 are coupled to a pair of drill stem grippers as described in more detail below. Although two linear actuators are shown, the invention is not so limited. Other configurations may include a single linear actuator, or more than two linear actuators.

A drill head 142 is shown at a rear of the drill stem loader 140. The drill head 142 is mounted to a carriage frame 143 along a movable track. In one example, a drill fluid supply system 160 is coupled to the directional drill 100, adjacent to the drill head 142. During a drilling operation, the drill head 142 is operated to both rotate the drill stem 110, and to drive the drill stem 110 forward into the ground. The drill stem vice 120 is shown at a front end of the drill stem loader 140. During a drilling operation, the drill stem vice 120 selectively holds or releases individual segments of the drill stem 110 to aid in the adding or removal of drill stem segments (by screwing or unscrewing a threaded joint at either end of the drill stem segment).

Figure 3A:
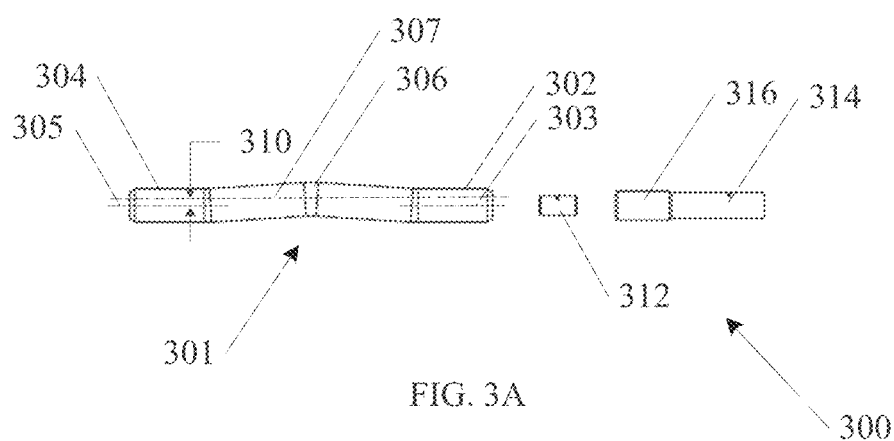
FIG. 3A is a pipe loosening device in accordance with some embodiments of the invention.

FIG. 3A shows a pipe loosening device 300 according to one example. The pipe loosening device 300 includes a solid single deforming die 301 and a connection to forcing equipment. In the example of FIG. 3A, the forcing equipment is a cable 314 that is coupled to the deforming die 301 with a coupler 312. In one example, the cable 314 is pulled by a winch (not shown). Other cable pulling equipment, such as a cyclic puller, may also be used.

The solid single deforming die 301 includes a leading end cylinder portion 302 and a trailing end cylinder portion 304. The leading end cylinder portion 302 includes a leading end axis 303, and the trailing end cylinder portion 304 includes a trailing end axis 305. The leading end axis 303 and the trailing end axis 305 are substantially aligned.

In one example, both the leading end cylinder portion 302 and the trailing end cylinder portion 304 have a first diameter. In one example, the first diameter substantially matches an inner diameter of a pipe to be replaced. In one example, the leading end cylinder portion 302 and the trailing end cylinder portion 304 slide within the pipe to be replaced with a close tolerance fit. In one example the close tolerance fit serves to guide the solid single deforming die 301 and determines how a deforming force is applied using a deforming cylinder portion 306.

As noted, the solid single deforming die 301 includes a deforming cylinder portion 306 coupled between the leading end cylinder portion 302 and the trailing end cylinder portion 304. The deforming cylinder portion 306 includes an axis 307 that is displaced by a distance 310 away from the trailing end axis and the leading end axis. In one example, the deforming cylinder portion 306 is coupled between the leading end cylinder portion 302 and the trailing end cylinder portion 304 using a gentle transition or slope. In one example, this configuration helps to gradually apply a deforming force to a sidewall of the pipe to be replaced.

In one example, one or more of the leading end cylinder portion 302, the trailing end cylinder portion 304, and the deforming cylinder portion 306 includes a material that is hardened to resist galling or cold welding on the inside of the pipe to be replaced. In one example, one or more of the leading end cylinder portion 302, the trailing end cylinder portion 304, and the deforming cylinder portion 306 is formed from a hardened steel. In one example a hardness is within a range of 60-65 Rockwell C. In one example, one or more of the leading end cylinder portion 302, the trailing end cylinder portion 304, and the deforming cylinder portion 306 is case hardened, carburized, or otherwise coated to have a hard external surface.

In one example, a hardened insert is mechanically attached to wear points on one or more of the leading end cylinder portion 302, the trailing end cylinder portion 304, and the deforming cylinder portion 306. An example of attachment includes, but is not limited to, screws, bolts, welding, adhesives, dovetail joints etc. Examples of hardened inserts includes, but is not limited to, tungsten carbide, or other carbides, hardened tool steel, coated tool steel, etc.

In one example a low friction insert may be used. An example of a low friction insert includes, but is not limited to an aluminum-bronze alloy. In the example of aluminum-bronze, such an alloy provides a low friction in relation to several pipe material, specifically black iron. In one example, a lubricant may be used to further reduce friction and any resulting galling or cold welding.

Figure 3B:
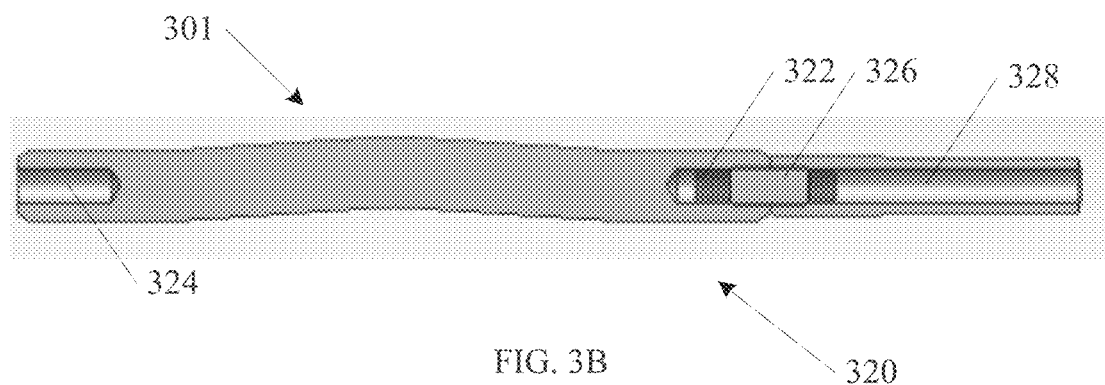
FIG. 3B is another pipe loosening device in accordance with some embodiments of the invention.

FIG. 3B shows another example of a pipe loosening device 320 according to one example. The pipe loosening device 320 includes a solid single deforming die 301 and a connection to forcing equipment. In the example of FIG. 3B, the forcing equipment is a drill stem 328 from a directional drill, such as directional drill 100 from FIGS. 1 and 2. The drill stem 328 is shown coupled to the solid single deforming die 301 with a coupler 326.

In the example of FIG. 3B, a threaded connection 322 is shown on the leading end cylinder portion 302. In one example, a second threaded connection 324 is shown on the trailing end cylinder portion 304. Various combinations of threaded connections may be used in different combinations. In the example shown in FIG. 3B, the solid single deforming die 301 is flexible in the method of connection to forcing equipment. Either pushing or pulling equipment may be used. In the example, shown, the threaded connections 322, 324 are both female threads. However, the invention is not so limited. One or both of the threaded connections 322, 324 may be male threads instead. In one example, one or more of the threaded connections 322, 324 may include a tapered thread, to mate with a tapered thread on a directional drill stem.

Figure 3C:
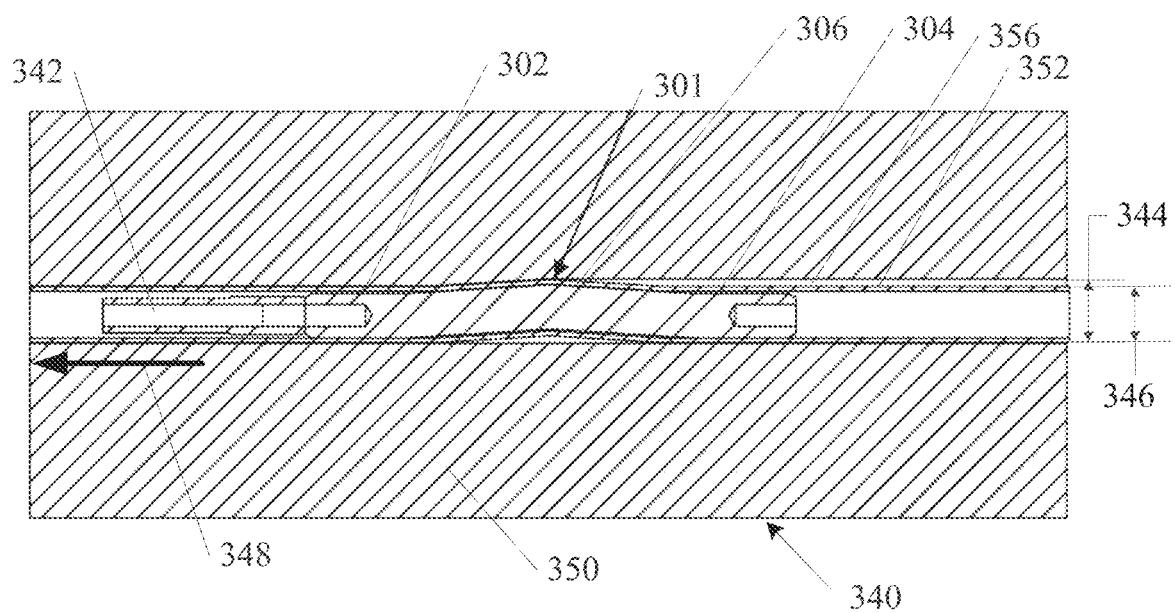
FIG. 3C is a pipe loosening device in use in accordance with some embodiments of the invention.

FIG. 3C shows another example of a pipe loosening device 340 according to one example. The pipe loosening device 320 includes a solid single deforming die 301 and a connection to forcing equipment. In the example of FIG. 3C, the forcing equipment is a drill stem 342 from a directional drill, such as directional drill 100 from FIGS. 1 and 2.

The pipe loosening device 340 in FIG. 3C is shown in operation within a pipe to be replaced 352. The pipe to be replaced is shown embedded within soil 350. In operation, the solid single deforming die 301 is pulled or pushed in direction 348. The diameter of the leading end cylinder portion 302 and the trailing end cylinder portion 304 substantially matches an inner diameter 346 of the pipe to be replaced 352. Because of the substantial matching, the leading end cylinder portion 302 and the trailing end cylinder portion 304 guide the solid single deforming die 301 through the pipe to be replaced 352 in a controlled manner.

As the solid single deforming die 301 is pulled, the deforming cylinder portion 306 is forced against a sidewall of the pipe to be replaced 352. The deforming cylinder portion 306 pushes the sidewall portion outward into the surrounding soil and causes a gap 356 to form between the sidewall of the pipe to be replaced 352 and the soil 350. In one example, the pipe to be replaced 352 is not burst or in any other way split or opened to the soil 350. Bursting, splitting, or otherwise opening up the pipe to be replaced 352 to the surrounding soil may cause additional unwanted friction when the pipe to be replaced 352 is later removed from the soil along an axis of the pipe. Bursting, splitting, or otherwise opening up the pipe to be replaced 352 may also weaken the pipe to be replaced, and cause it to break during the later extraction operation where the pipe to be replaced 352 is removed from the soil along an axis of the pipe.

FIG. 3C shows how the gap 356 increases dimension 344 to an dimension that is larger than the diameter 346 of the pipe to be replaced. Although the invention is not so limited, in one example, the diameter of the pipe to be replaced is approximately 1.66 inches, and the dimension 344 after passing of the deforming cylinder portion 306 is approximately 1.901 inches. In one specific example, for a ⅝ inch copper OD pipe, the dimension 344 is about 13% of the OD. In another specific example, for a 1½ inch steel OD pipe, the dimension 344 is about 11% of the OD. In another specific example, for a 2 inch steel OD pipe, the dimension 344 is about 9% of the OD.

In one example, in order to deform, but not burst the pipe to be replaced 352, the deforming cylinder portion 306 includes an axis 307 that is displaced by a distance 310 away from the trailing end axis and the leading end axis that is between 5 and 15 percent of the diameter of the leading end cylinder portion 302 and the trailing end cylinder portion 304. In one example, the displacement 310 is approximately 7 percent of the diameter of the leading end cylinder portion 302 and the trailing end cylinder portion 304. In one example, the displacement 310 decreases as the OD of the pipe to be replaced increases.

As noted above, the diameter of the leading end cylinder portion 302 and the trailing end cylinder portion 304 will vary depending on the inner diameter of the pipe to be replaced 352. However, in one example, the percent displacement of the distance 310 away from the trailing end axis and the leading end axis is proportional, depending on the diameter of the pipe to be replaced.

In one example, the passing of the solid single deforming die 301 through the pipe to be replaced 352 will loosen the pipe from within the soil 350. After loosening, the pipe to be replaced 352 may be pulled from the ground along an axis of the pipe, such as in direction 348. If the pipe is not loosened from the soil 350, the pipe may tear, with portions of the pipe undesirably remaining in the soil 350.

Any number of possible pipe typed may be replaced using the devices and methods shown. Examples include, but are not limited to, lead pipes, copper pipes, natural gas pipes, etc. In one particular example, small diameter black iron gas pipe may be replaced using the devices and methods described above. In may be necessary to remove small diameter black iron gas pipe from the ground, instead of bursting the pipe, due to concerns for new plastic pipe being drawn in to the ground to replace the black iron pipe. In some instances, bursting may be inadequate to move the old pipe out of the way of the new pipe being drawn in. The old pipe may cut or damage the new pipe. In such an instance, it may be desirable to remove the old pipe from the ground.

Figure 4:
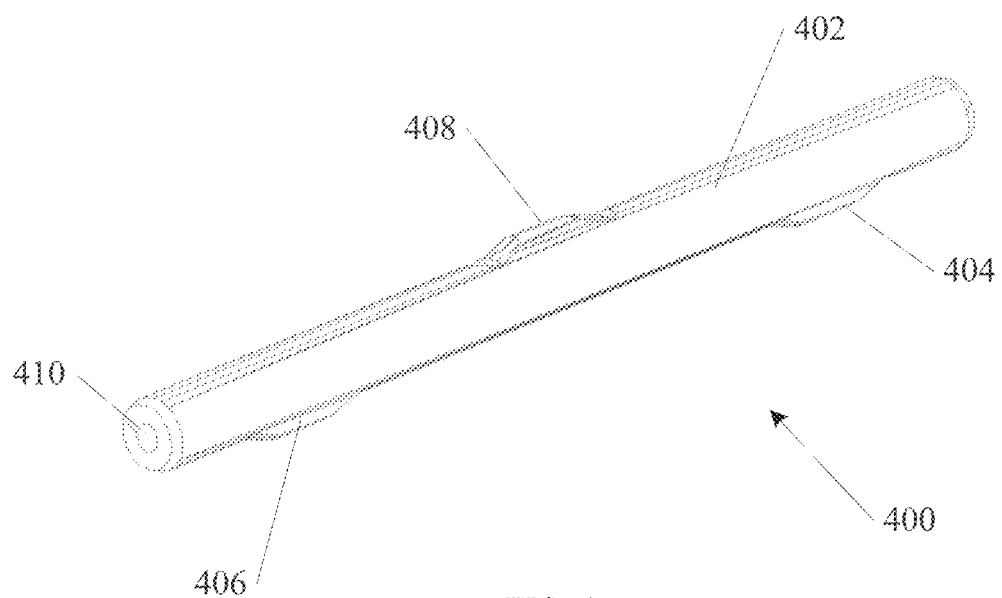
FIG. 4 is another pipe loosening device in accordance with some embodiments of the invention.

FIG. 4 shows another pipe loosening device according to one example. A deforming die 401 is shown that may be used in a manner similar to the examples shown in FIGS. 3A-3C. Any suitable forcing equipment may be used, as described above, including but not limited to, cables, winches, cyclic pullers, pipe pushers, directional drills and drill stem, etc.

The deforming die 401 includes a cylinder portion 402. In one example, the cylinder portion 402 have a first diameter. In one example, the first diameter substantially matches an inner diameter of a pipe to be replaced. In one example, the cylinder portion 402 slides within the pipe to be replaced with a close tolerance fit. In one example the close tolerance fit serves to guide the deforming die 401 and determines how a deforming force is applied using deforming inserts as described below.

FIG. 4 shows a first end insert 404, a second end insert 406, and a middle insert 408. In one example, the inserts 404, 406, 408 include tungsten carbide inserts. Although tungsten carbide is used as an example, other hard materials may also be used. Examples include, but are not limited to, other carbide materials, hardened tool steels, ceramic materials, etc. Inserts may be secured to the cylinder portion 402 in a number of possible configurations, such as welding, or adhesive such as epoxy to secure inserts within a pocket. Inserts may also be secured using threaded fasteners through a hole from a side of the cylinder portion 402 opposite the inserts. In one example, the inserts are replaceable.

In use, when the protruding inserts force themselves against a sidewall of a pipe to be replaced, deformation occurs in the pipe to be replaced. The deformation is small enough to loosen soil that surrounds the pipe to be replaced, but the deformation is not large enough to tear the pipe to be replaced apart. In this way, the pipe to be replaced maintains enough integrity to be pulled from the ground without fracturing, but the loosened soil reduces friction on an outer surface of the pipe to be replaced, facilitating easier removal.

FIG. 4 further shows a central opening 410 that may be threaded or otherwise configured for attachment to forcing equipment such as a directional drill etc. as described above. Although three inserts 404, 406, 408 are shown, the invention is not so limited. Other numbers of inserts and other placement of inserts may also be used within the scope of the invention. Primarily, the inserts may be placed and configured to provide enough deformation to loosen a pipe to be replaced within surrounding soil, but the inserts may not provide so much deformation that the pipe to be replaced is significantly damaged.

Figure 5:
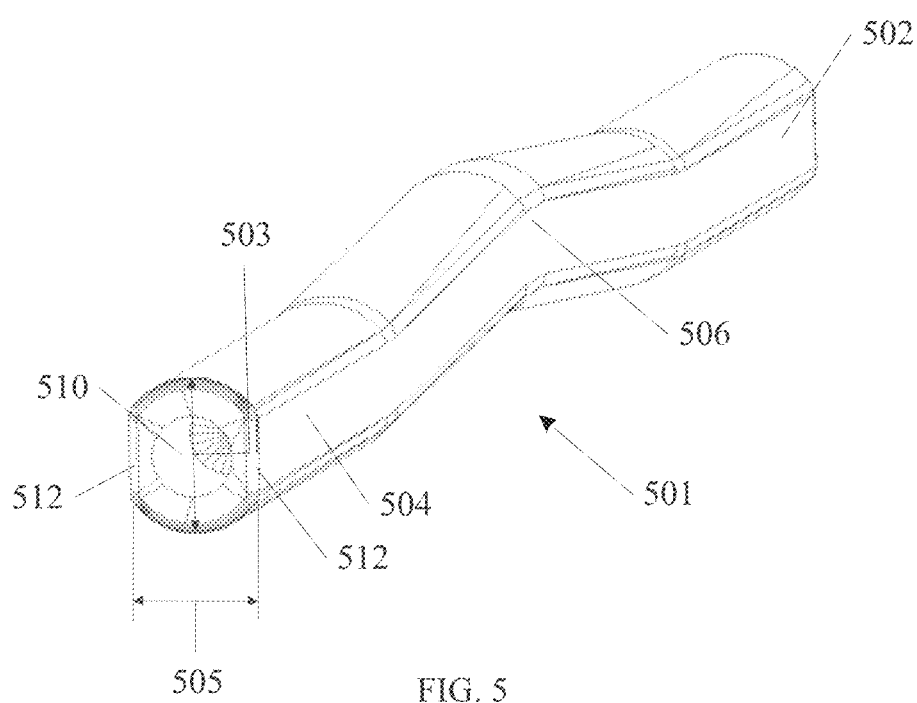
FIG. 5 is another pipe loosening device in accordance with some embodiments of the invention.

FIG. 5 shows a deforming die 501 that may be used in a manner similar to the examples shown in FIGS. 3A-3C. Any suitable forcing equipment may be used, as described above, including but not limited to, cables, winches, cyclic pullers, pipe pushers, directional drills and drill stem, etc.

The deforming die 501 includes a leading end cylinder portion 502 and a trailing end cylinder portion 504. The leading end cylinder portion 502 includes a leading end axis, and the trailing end cylinder portion 504 includes a trailing end axis. In the example of FIG. 5, the leading end axis and the trailing end axis are substantially aligned.

In one example, both the leading end cylinder portion 502 and the trailing end cylinder portion 504 have a first diameter 503. In one example, the first diameter 503 substantially matches an inner diameter of a pipe to be replaced. In one example, the leading end cylinder portion 502 and the trailing end cylinder portion 504 slide within the pipe to be replaced with a close tolerance fit. In one example the close tolerance fit serves to guide the deforming die 501 and determines how a deforming force is applied using a deforming cylinder portion 506.

In one example, the first diameter 503 is between about 90% and about 60% of an inner diameter of a pipe to be replaced. In one example, for inner diameters of a 1¼ to 1½ inch pipe to be replaced, the first diameter 503 is about 85% of the inner diameter of the pipe to be replaced. In one example, for inner diameters of a 2 inch pipe to be replaced, the first diameter 503 is about 65% of the inner diameter of the pipe to be replaced.

The deforming die 501 includes a deforming cylinder portion 506 coupled between the leading end cylinder portion 502 and the trailing end cylinder portion 504. The deforming cylinder portion 506 includes an axis that is displaced by a distance away from the trailing end axis and the leading end axis, similar to the example shown in FIGS. 3A-3C. In one example, the deforming cylinder portion 506 is coupled between the leading end cylinder portion 502 and the trailing end cylinder portion 504 using a gentle transition or slope. In one example, this configuration helps to gradually apply a deforming force to a sidewall of the pipe to be replaced.

Similar to examples above, in order to deform, but not burst the pipe to be replaced, the deforming cylinder portion 506 includes an axis that is displaced by a distance away from the trailing end axis and the leading end axis that is between 5 and 15 percent of the diameter of the leading end cylinder portion 502 and the trailing end cylinder portion 504. In one example, the displacement decreases as the OD of the pipe to be replaced increases.

FIG. 5 further shows a central opening 510 that may be threaded or otherwise configured for attachment to forcing equipment such as a directional drill, cable pulling, etc. as described above.

FIG. 5 further shows sides 512 perpendicular to the direction of deforming cylinder portion 506 offset. In the example shown, the sides 512 are reduced from the first diameter 503 to reduced width 505. In one example, the reduced width 505 further facilitates deformation of the pipe to be replaced, allowing it to become more "oval" around the deforming die 501. The oval cross section further enhances loosening of the pipe to be replaced within the soil. Although illustrated in FIG. 5, the reduced width 505 configuration may be applied to any of the examples described in the present disclosure.

Figure 6:
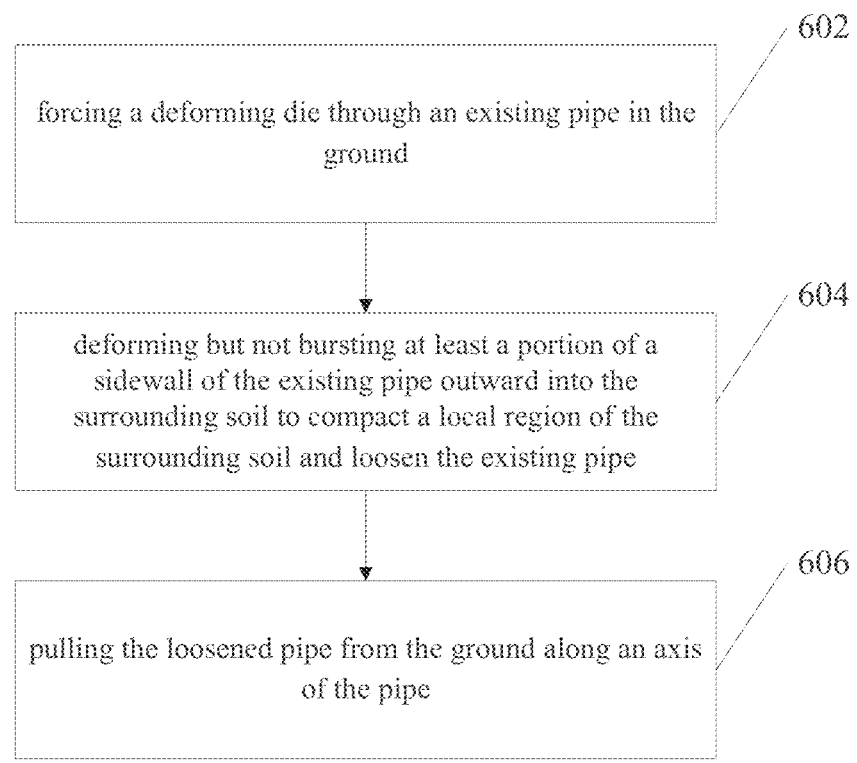
FIG. 6 is a flow diagram of a method of pipe extraction in accordance with some embodiments of the invention.

FIG. 6 shows a flow diagram of a method of pipe extraction according to an embodiment of the invention. In operation 602 a deforming die, such as the solid single deforming die 301, deforming die 401, or deforming die 501 is forced through an existing pipe in the ground. In operation 604, at least a portion of a sidewall of the existing pipe is deformed but not burst outward into the surrounding soil to compact a local region of the surrounding soil and loosen the existing pipe. In operation 606, the loosened pipe is pulled from the ground along an axis of the pipe.

To better illustrate the method and apparatuses disclosed herein, a non-limiting list of examples is provided here:

Example 1 includes a pipe loosening device. The pipe loosening device includes a solid single deforming die, including a leading end cylinder portion, having a first diameter, a trailing end cylinder portion, having a diameter substantially matching the first diameter, wherein a trailing end axis is substantially aligned with a leading end axis, and a deforming cylinder portion located between the leading end cylinder portion and the trailing end cylinder portion, wherein an axis of the deforming cylinder portion is parallel to, and displaced by a distance away from the trailing end axis and the leading end axis.

Example 2 includes the pipe loosening device of example 1, wherein the distance of displacement of the axis of the deforming cylinder portion from the trailing end axis and the leading end axis is between 5 and 10 percent of the first diameter.

Example 3 includes the pipe loosening device of any one of examples 1-2, wherein the distance of displacement of the axis of the deforming cylinder portion from the trailing end axis and the leading end axis is approximately 7 percent of the first diameter.

Example 4 includes the pipe loosening device of any one of examples 1-3, further including a threaded connection on the leading end cylinder portion that is adapted to couple to a directional drill rod section.

Example 5 includes the pipe loosening device of any one of examples 1-4, wherein the threaded connection is a female threaded connection.

Example 6 includes the pipe loosening device of any one of examples 1-5, wherein the threaded connection is a male threaded connection.

Example 7 includes the pipe loosening device of any one of examples 1-6, further including a threaded connection on the trailing end cylinder portion that is adapted to couple to a directional drill rod section.

Example 8 includes the pipe loosening device of any one of examples 1-7, wherein the threaded connection is a female threaded connection.

Example 9 includes the pipe loosening device of any one of examples 1-8, wherein the threaded connection is a male threaded connection.

Example 10 includes a method of pipe extraction. The method includes forcing a deforming die through an existing pipe in the ground, deforming but not bursting at least a portion of a sidewall of the existing pipe outward into the surrounding soil to compact a local region of the surrounding soil and loosen the existing pipe, and pulling the loosened pipe from the ground.

Example 11 includes the method of example 10, wherein forcing the deforming die includes pulling with a directional drill stem.

Example 12 includes the method of any one of examples 10-11, wherein forcing the deforming die includes pulling with a winch.

Example 13 includes the method of any one of examples 10-12, wherein forcing the deforming die includes pushing with a directional drill stem.

Example 14 includes the method of any one of examples 10-13, wherein forcing the deforming die includes pushing with a rod pusher.

Example 15 includes the method of any one of examples 10-14, wherein forcing the deforming die includes pushing with a pneumatic hammer.

Example 16 includes the method of any one of examples 10-15, wherein deforming but not bursting at least a portion of a sidewall of the existing pipe includes deforming with a solid single deforming die, including a leading end cylinder portion, having a first diameter, a trailing end cylinder portion, having a diameter substantially matching the first diameter, wherein a trailing end axis is substantially aligned with a leading end axis, and a deforming cylinder portion located between the leading end cylinder portion and the trailing end cylinder portion, wherein an axis of the deforming cylinder portion is parallel to, and displaced by a distance away from the trailing end axis and the leading end axis.

Example 17 includes a pipe loosening device, including a deforming die, including a cylinder portion sized with a cylinder diameter to fit closely within an inner diameter of a pipe to be replaced, and one or more inserts coupled to a side of the cylinder portion, wherein the one or more inserts protrude from the cylinder portion by a distance.

Example 18 includes the pipe loosening device of example 17, wherein the distance is between 5 and 10 percent of the cylinder diameter.

Example 19 includes the pipe loosening device of any one of examples 17-18, wherein the distance is approximately 7 percent of the cylinder diameter.

Example 20 includes the pipe loosening device of any one of examples 17-19, further including a threaded connection on the cylinder portion that is adapted to couple to a directional drill rod section.

Example 21 includes the pipe loosening device of any one of examples 17-20, wherein the one or more inserts are formed from tungsten carbide.

Example 22 includes the pipe loosening device of any one of examples 17-21, wherein the one or more inserts include two end inserts and a central insert on a side of the cylinder portion opposite the end inserts.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A pipe loosening device, comprising:
   a deforming die, including:
   a body portion sized to fit closely within an inner diameter of a pipe to be replaced, the body portion having a longitudinal axis; and
   one or more protrusions on a side of the body portion, wherein the one or more protrusions extend from the body portion by a distance, wherein the one or more protrusions include two protrusions on a same side of the body portion, the two protrusions spaced apart from one another along the longitudinal axis, and a central protrusion on a side of the body portion opposite the two protrusions, and located longitudinally between the two protrusions.

2. The pipe loosening device of claim 1, wherein the distance is between 5 and 10 percent of a body portion diameter.

3. The pipe loosening device of claim 2, wherein the distance is approximately 7 percent of the body portion diameter.

4. The pipe loosening device of claim 1, further including a threaded connection on the body portion that is adapted to couple to a directional drill rod section.

5. The pipe loosening device of claim 1, wherein the one or more protrusions are formed from tungsten carbide.

6. The pipe loosening device of claim 1, wherein a protrusion direction of each of the one or more protrusions all protrude in a common plane.

7. The pipe loosening device of claim 6, further including reduced width sides of the deforming die along all of the longitudinal axis in a direction perpendicular to the common plane.

8. A pipe loosening device, comprising:
   a deforming die, including:
   a body portion sized to fit closely within an inner diameter of a pipe to be replaced, the body portion having a longitudinal axis;
   one or more protrusions coupled to a side of the body portion, wherein the one or more protrusions extend from the body portion by a distance, wherein the one or more protrusions include two protrusions on a same side of the body portion, the two protrusions spaced apart from one another along the longitudinal axis, and a central protrusion on a side of the body portion opposite the two protrusions, and located longitudinally between the two protrusions; and
   a threaded connection on the body portion that is adapted to couple to a directional drill rod section.

9. The pipe loosening device of claim 8, wherein the threaded connection is a female threaded connection.

10. The pipe loosening device of claim 8, wherein the threaded connection is a male threaded connection.

11. The pipe loosening device of claim 8, wherein a protrusion direction of each of the one or more protrusions all protrude in a common plane.

12. The pipe loosening device of claim 11, further including reduced width sides of the deforming die along all of the longitudinal axis in a direction perpendicular to the common plane.

13. A pipe loosening system, comprising:
   a directional drill;
   one or more drill stem sections coupled to the directional drill;
   a deforming die coupled to a distal end of the one or more drill stem sections, including:
   a body portion sized to fit closely within an inner diameter of a pipe to be replaced, the body portion having a longitudinal axis; and
   one or more protrusions coupled to a side of the body portion, wherein the one or more protrusions extend from the body portion by a distance, wherein the one or more protrusions include two protrusions on a same side of the body portion, the two protrusions spaced apart from one another along the longitudinal axis, and a central protrusion on a side of the body portion opposite the two protrusions, and located longitudinally between the two protrusions.

14. The pipe loosening device of claim 13, wherein the distance is between 5 and 10 percent of a body portion diameter.

15. The pipe loosening device of claim 14, wherein the distance is approximately 7 percent of the body portion diameter.

16. The pipe loosening device of claim 13, further including a threaded connection on the body portion that is adapted to couple to a directional drill rod section.

17. The pipe loosening device of claim 13, wherein the one or more protrusions are formed from tungsten carbide.

18. The pipe loosening device of claim 13, wherein a protrusion direction of each of the one or more protrusions all protrude in a common plane.

19. The pipe loosening device of claim 18, further including reduced width sides of the deforming die along all of the longitudinal axis in a direction perpendicular to the common plane.

* * * * *